US008046680B2

(12) United States Patent
Ruellan et al.

(10) Patent No.: US 8,046,680 B2
(45) Date of Patent: Oct. 25, 2011

(54) METHOD AND DEVICE FOR GENERATING REFERENCE STRUCTURAL PATTERNS ADAPTED TO REPRESENT HIERARCHIZED DATA

(75) Inventors: Hervé Ruellan, Rennes (FR); Romain Bellessort, Le Mans (FR)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 11/797,776

(22) Filed: May 8, 2007

(65) Prior Publication Data
US 2007/0276827 A1    Nov. 29, 2007

(30) Foreign Application Priority Data

May 11, 2006  (FR) ...................................... 0604209

(51) Int. Cl.
G06F 17/00 (2006.01)
G06F 15/16 (2006.01)
(52) U.S. Cl. . 715/234; 715/255; 715/760; 707/999.006; 707/E17.012
(58) Field of Classification Search .................. 715/200, 715/201, 205, 206, 234, 242, 244, 253, 255, 715/256, 273, 760; 707/602, 695, 778, 805, 707/999.006, E17.001, E17.012
See application file for complete search history.

(56) References Cited

U.S. PATENT DOCUMENTS

| | | | | |
|---|---|---|---|---|
| 5,923,328 A * | 7/1999 | Griesmer | | 715/854 |
| 6,418,426 B1 * | 7/2002 | Schlesinger | | 707/610 |
| 6,448,985 B1 * | 9/2002 | McNally | | 715/784 |
| 6,990,632 B2 | 1/2006 | Rothchiller et al. | | |
| 7,296,223 B2 * | 11/2007 | Chidlovskii et al. | | 715/234 |
| 7,555,731 B2 * | 6/2009 | Torgerson | | 715/854 |
| 2001/0014899 A1 * | 8/2001 | Fujikawa | | 707/513 |
| 2005/0022162 A1 | 1/2005 | Moreau et al. | | |
| 2005/0050459 A1 * | 3/2005 | Qu et al. | | 715/513 |
| 2006/0143579 A1 * | 6/2006 | Torgerson | | 715/854 |

OTHER PUBLICATIONS

French Preliminary Search Report; Mailing Date Dec. 1, 2006.
Helena Ahonen, "Automatic generation of SGML content models", Electronic Publishing, vol. 8, No. 2-3, 1995, pp. 195-205.
Phillip Bille, "Tree Edit Distance, Alignment Distance and Inclusion", IT University Technical Report Series, TR-2003-23, Mar. 28, 2003, pp. 1-22.
Jong P. Yoon, et al., "Multi-Level Schema Extraction for Heterogenous Semi-Structured Data", Web-Age Information Management, 2000, pp. 411-422.

(Continued)

*Primary Examiner* — Maikhanh Nguyen
(74) *Attorney, Agent, or Firm* — Fitzpatrick, Cella, Harper & Scinto

(57) ABSTRACT

Generating reference structural patterns representing hierarchized data, by extracting primary structural patterns. Each primary structural pattern represents a set of pieces of structural information. The degree of use of extracted primary structural patterns is determined based on of the number of hierarchized pieces of data able to be represented by the primary structural patterns. Primary structural patterns are grouped based on the degree of use and a distance between primary structural patterns. One reference structural pattern per group is determined, the reference structural pattern representing the primary structural patterns of the associated group. The degree of use favors grouping of a primary structural pattern with other primary structural patterns even if it has numerous structural differences if the primary structural pattern has few occurrences, and favors creation of a separate group containing the primary structural pattern even if it has few structural differences if the primary structural pattern has many occurrences.

17 Claims, 15 Drawing Sheets

OTHER PUBLICATIONS

Boris Chidlovskii, "Schema Extraction from XML Data: A Grammatical Inference Approach", Workshop on Knowledge Representation and Databases, 2001, pp. 1-16.

Jon Hegewald, et al., "XStruct: Efficient Schema Extraction from Multiple and Large XML Documents", Proceedings of the 22nd International Conference on Data Engineering Workshops, 2006, pp. 1-10.

Juryon Paik, et al., "Efficient Extraction of Maximally Common Subtrees from XML Documents for Web Services", Advanced Communication Technology, 2005, ICACT 2005. The 7th International Conference on Phoenix Park, pp. 1371-1375.

* cited by examiner (PRIOR ART)

```
<list>
    <employee>
        <forename>Jean</forename>
        <surname>Dupont</surname>
    </employee>
    <employee>
        <forename>Marie</forename>
        <surname>Durand</surname>
    </employee>
    <employee>
        <forename>Jacques</forename>
        <surname>Martin</surname>
        <town>Rennes</town>
    </employee>
</list>
```

Figure 1

| primary pattern | Name | # of items | item 1 | item 2 | item 3 |
|---|---|---|---|---|---|
| m1 | list | 3 | pointer to pattern | pointer to pattern | pointer to pattern |
| m2 | employee | 2 | pointer to pattern | pointer to pattern | |
| m4 | employee | 3 | pointer to pattern | pointer to pattern | pointer to pattern |
| m5 | forename | 1 | text | | |
| m6 | surname | 1 | text | | |
| m11 | town | 1 | text | | |

| primary pattern | Name | # of items | item 1 | item 1-1 | item 1-2 | item 2 | item 2-1 | item 2-2 | item 3 | item 3-1 | item 3-2 | item 3-3 |
|---|---|---|---|---|---|---|---|---|---|---|---|---|
| m1 | list | 10 | employee | pointer to pattern | pointer to pattern | employee | pointer to pattern | pointer to pattern | employee | pointer to pattern | pointer to pattern | pointer to pattern |
| m2 | employee | 4 | forename | text | | surname | text | | | | | |
| m4 | employee | 6 | forename | text | | surname | text | | town | text | | |

Figure 5d

| field A | field B | field C | meaning |
|---|---|---|---|
| $a_1a_2a_3a_4a_5a_6a_7a_8$ | | | |
| 0000 0000 | pattern identifier | - | Beginning of the coding of an instance of structural pattern which definition is identified by the code of field B |
| 0000 0001 | pattern identifier | - | Beginning of the coding of a structural pattern definition to which is assigned an identification code of field B |
| 1010 0000 | length | name | Definition of an item of type XML element (whose name length is defined by the code of field B and whose name is defined by the code of field C). |
| 1011 0000 | | | Definition of an item of type text. |
| 0000 0010 | pattern identifier | reference identifier | Beginning of the coding of a structural pattern definition to which is assigned an identification code of field B, by reference to the structural pattern identified by the code of field C. |
| 0001 $a_5a_6a_7a_8$ | position | (position) | Addition of new element at level $a_5a_6a_7a_8$ (position defined by field B and following, C being optional) |
| 0010 $a_5a_6a_7a_8$ | position | (position) | Suppression of element at level $a_5a_6a_7a_8$ (position defined by field B and following, C being optional) |
| 0011 $a_5a_6a_7a_8$ | position | (position) | Modification of element at level $a_5a_6a_7a_8$ (position defined by field B and following, C being optional) |
| 1111 1111 | - | - | End of the coding of the instance or the definition of the structural pattern |

Figure 7b

|  | coding | | | meaning |
|---|---|---|---|---|
|  | field A | field B | field C |  |
| node 3 | 0000 0000 | 0101 0101 |  | "01010101" represents m2 (cf. fig. 7c) |
|  | 0000 0000 |  |  | no structural difference with pattern |
|  | 0000 0101 | "Marie" |  | Content of first text item |
|  | 0000 0110 | "Durand" |  | Content of second text item |
|  | 1111 1111 |  |  | End of instance coding |
|  | ... |  |  |  |
| node 4 | 0000 0000 | 0101 0101 |  | "0101 0101" represents m2 |
|  | 0000 0001 |  |  | 1 structural difference with pattern |
|  | 0001 0001 | 0000 0010 |  | Add new child item at level 1 in position 2 |
|  | 0000 0111 | "Jacques" |  | Content of first text item |
|  | 0000 0110 | "Martin" |  | Content of second text item |
|  | 1010 0000 | 0000 0100 | "town" | Definition of new item as element "town" |
|  | 0000 0001 |  |  | number of child items (1) |
|  | 1011 0000 |  |  | Child item: type text |
|  | 0000 0110 | "Rennes" |  | Content of new text item |
|  | 1111 1111 |  |  | End of instance coding |
|  | ... |  |  |  |
| node 12 | 0000 0000 | 0101 0101 |  | "01010101" represents m2 (cf. fig. 7c) |
|  | 0000 0001 |  |  | 1 structural difference with pattern |
|  | 0011 0000 |  |  | Modification of main element |
|  | 1010 0000 | 0000 0111 | "manager" | Redefinition of main element from "employee" to "manager" |
|  | 0000 0100 | "Paul" |  | Content of first text item |
|  | 0000 1000 | "Anderson" |  | Content of second text item |
|  | 1111 1111 |  |  | End of instance coding |

Figure 7d

METHOD AND DEVICE FOR GENERATING REFERENCE STRUCTURAL PATTERNS ADAPTED TO REPRESENT HIERARCHIZED DATA

The present invention concerns a method, a device and a computer program for generating reference structural patterns adapted to represent hierarchized data. The invention also concerns a method, a device and a computer program for the coding of this type of data using the reference structural patterns so generated.

Numerous applications manipulate hierarchically structured data, also termed "hierarchized data". A document of hierarchized data incorporates two types of information: a first type of information informing as to the structure of the document and a second type of information informing as to the actual content of the data.

The pieces of information of the first type, termed "structural information", are all pieces of information which serve for hierarchizing the data. The pieces of information of the second type, termed "content information", represent the values or the instances taken by the data of the document.

The link between the pieces of structural information and the pieces of content information depends on the language used for hierarchizing the data. However, generally, a document containing hierarchized data may be seen as a set of "items" organized into a "tree". An item represents a "node" if it contains at least one other item and represents a "leaf" if it contains no other item. The node situated at the highest hierarchical level is the root node. The root node may therefore contain sub-nodes, also termed "child-nodes", which themselves may contain other sub-nodes and so forth.

A node is identified in the data structure using an opening tag and, most often, a closing tag. All the data situated between the opening tag and the closing tag form part of the node and represent the item or items situated at the hierarchical level below that node. Thus, if one of the items is a child-node, the tags defining that child-node and the data which are associated with it are contained between the two tags of the parent node.

There are several manners of describing a hierarchized data structure. The most usual uses XML, which is an acronym for "eXtensible Markup Language". This language is standardized by the W3C standardization committee (a description of the language may be found in the website at w3.org in the subdirectory "REC-xml" of subdirectory "TR". XML is increasingly used for the storage and the transmission of digital data.

The XML language defines a particular syntax for mixing pieces of structural and content information. According to this syntax, a node, termed "element", is defined by an opening tag, a closing tag and an identifier. A leaf item, that is to say an item other than an element, most often represents content and may be, for example, text, a comment, a processing instruction or an attribute. The attribute is an item localized in the opening tag of an element and contains, in addition to the actual content of the attribute, an identifier for defining it.

FIG. 1 presents a simple example of a document containing hierarchized data written in XML language. This document contains eleven elements. The root element, having the identifier "list", is delimited by the opening tag "<list>" and the closing tag "</list>", and comprises three elements "employee". The elements "employee" contain in themselves other elements like "forename", "surname" or "town".

The XML language has numerous advantages. XML syntax is textual, and can thus be read or written easily by a user. It is also generic. It may thus serve as a basis for the construction of new more complex languages.

However, description in XML language has a certain number of drawbacks.

Firstly, a document written in XML language is of large size since the document includes not only pieces of content information which correspond to the actual information, but also pieces of structural information. Thus, the manipulation of such a document is rendered difficult, both in terms of storage and in terms of exchange or processing.

Furthermore, the pieces of structural information of which the initial role is to hierarchize the data of the document are not optimized for the various processing operations which may be applied to those data, such as the search for a particular item in the document or the compression of the document for its storage or its transmission.

A first approach for solving these problems is to use as a basis for processing not the pieces of structural information of the XML document itself, but those of a document which is associated with it or from which it derives. This is typically the case of an "XML schema" (of which a description may be found in the website at w3.org in the subdirectories "xmlschema-1" and "xmlschema-2" of subdirectory "TR").

The XML schema is a language which defines the types of data present in an XML document. A document written in XML schema constitutes in a kind of way a "directory" of the types of data authorized and a structural model for all the XML documents conforming to that schema. These types both concern the types of leaf items which are most often simple types (integer, text, etc.) and the types of XML elements. According to the syntax of XML schemas, the type of an element is defined by its identifier. Consequently, there are as many types of elements as there are different element identifiers. In the example of FIG. 1, there are five types of element which are: list, employee, surname, forename and town. The employee type comprises two sub-elements of surname and forename type, and, optionally, an element of town type.

A method of generating an XML schema from an XML document is for example known from the document US 2004/172591 of the company Microsoft, entitled "Method and system for inferring a schema from a hierarchical data structure for use in a spreadsheet". This generation of the XML schema is carried out on the basis of the identifiers of the XML elements. For this, on going through the document, if an identifier is encountered several times, the same structure is used to define the type of that element within the meaning of XML schemas.

The use of a schema makes it possible to improve the performance of certain processing operations since the schema informs about the structures of elements which must necessarily be complied with by the XML document. For example, it is known to use the XML schema document associated with an XML document to compress in order only to code the values of instances. Thus the decompression consists only of applying the instance values to the document of the XML schema to get back the original XML document.

The use of an XML schema is however not optimal for the application of processing operations to the XML document. This is because the syntax of the XML schemas serves in the first place to verify whether the types of the different items of an XML document are correct and whether the latter properly satisfies the constraints imposed by the template of the XML schema.

It would consequently be worthwhile to be able to carry out a new decomposition of a structured document, providing more pieces of information on the structure of the document, so as to enable numerous applications to achieve better performance when they process a document.

To that end, the invention concerns in the first place a method of generating reference structural patterns adapted to represent hierarchized data. The method comprises the following steps:

extracting primary structural patterns associated with the hierarchized data, each of the primary structural patterns representing a set of pieces of structural information;

determining the degree of use of extracted primary structural patterns on the basis of the number of hierarchized pieces of data able to be represented by said primary structural patterns;

grouping primary structural patterns into groups of primary structural patterns; said grouping being carried out on the basis of the degree of use of at least one primary structural pattern and of a measurement of distance between primary structural patterns; and determining one reference structural pattern per group of determined primary structural patterns, said reference structural pattern being adapted to represent the primary structural patterns of the group associated with it.

The invention provides for analyzing hierarchized data to extract structural patterns therefrom termed primary structural patterns. A structural pattern is the description of a part of the structure of the hierarchized data.

The objective of the invention is to find structural patterns which are repeated in the hierarchized data.

To do this, the method according to the invention provides for determining, on the basis of the primary structural patterns extracted from the data, reference structural patterns adapted to represent hierarchized data.

Later on, the reference structural patterns will make it possible, in particular, to code those data so as to reduce the size of those data.

The method is based, in particular, on a step of determining the degree of use of extracted primary structural patterns and a step of grouping primary structural patterns on the basis of the degree of use of the primary structural patterns and of a measurement of distance between primary structural patterns.

According to a feature, the hierarchized data being organized into a plurality of items, and an item representing a node if it contains at least one other item referred to as a child item, the pieces of structural information of a primary structural pattern are relative to a node and to its direct child items only.

According to this feature, the piece of structural information of a primary structural pattern is determined with respect to the piece of structural information contained in a node and in the child items of that node.

According to a variant embodiment, the pieces of structural information of a primary structural pattern are relative to a plurality of nodes having a hierarchical relationship between them.

According to this feature, the piece of structural information of a primary structural pattern is determined with respect to the piece of structural information contained in a plurality of nodes such that those nodes have a hierarchical relationship between them.

According to another feature, the hierarchized data are described in a markup language structuring the data, for example using the XML language.

According to an embodiment, the step of grouping primary structural patterns comprises the following steps:

selecting the primary structural pattern having a degree of use among the highest degrees of use;

grouping primary structural patterns situated, with respect to the selected primary structural pattern, at a distance less than or equal to a predetermined value; and repeating the steps of selecting and grouping with respect to the primary structural patterns not yet grouped.

According to this embodiment, selecting a primary structural pattern with a high degree of use makes it possible to determine that a high number of pieces of hierarchized data are able to be described by those primary structural patterns. The primary structural pattern thus selected then makes it possible to perform grouping of the primary structural patterns on the basis of that selected pattern.

According to a feature, the distance between a first and a second primary structural pattern also depends on the degree of use of the first primary structural pattern.

According to an embodiment, the step of grouping primary structural patterns comprises the following steps:

selecting a primary structural pattern;

grouping the primary structural patterns situated, with respect to the selected primary structural pattern, at a distance less than or equal to a predetermined value, said distance being weighted by the degree of use of the primary structural patterns; and repeating the steps of selecting and grouping with respect to the primary structural patterns not yet grouped.

According to another feature, the groups resulting from the grouping step comprise primary structural patterns which, considering them two at a time, are situated at a distance less than or equal to the predetermined value.

According to this feature, a group is determined such that the members of that group have between each of them a similarity, the similarity being determined by means of the calculation of a distance between primary structural patterns, considering them two at a time.

According to a specific embodiment, the distance between a first and a second primary structural pattern is defined by the number of pieces of structural information to add and/or to delete and/or to modify with respect to the first primary structural pattern to obtain the second primary structural pattern.

According to this embodiment, the calculation of the distance is carried out by determining the items to add, to delete and/or to modify to pass from a first primary structural pattern to a second primary structural pattern.

It is clearly understood that all the combinations between adding and/or deletion and/or modification may be envisaged in order to determine the result of the calculation of the distance between those two primary structural patterns.

According to an embodiment, the degree of use of a primary structural pattern is determined on the basis of the number of pieces of hierarchized data of which the pieces of structural information correspond to the pieces of structural information of that primary structural pattern.

According to another embodiment, the reference structural pattern associated with a group corresponds to the primary structural pattern of the primary structural patterns of the group having the highest degree of use.

According to still another embodiment, the reference structural pattern associated with a group is constructed by combining the pieces of structural information from all the primary structural patterns of the group, the reference structural pattern so determined being referred to as the encompassing reference structural pattern.

According to this embodiment, the reference structural pattern determined comprises all the pieces of structural information of all the primary structural patterns of the group.

According to an embodiment of the determination of a reference structural pattern, the reference structural pattern associated with a group is determined on the basis of at least some of the primary structural patterns of the group and, for each primary structural pattern, a measurement of representativeness with respect to the hierarchical data associated with primary structural patterns of the group, the reference structural pattern so determined being referred to as the median reference structural pattern.

More particularly, the reference structural pattern associated with a group is determined on the basis of the primary structural patterns having the highest representativeness measurements.

According to a feature of an embodiment, the measurement of representativeness of a primary structural pattern depends on the degrees of use of the primary structural patterns of the group.

According to a feature, the measurement of representativeness of a primary structural pattern is the sum of the degrees of use of the primary structural patterns of the group, weighted by the distances between the primary structural pattern considered and the primary structural patterns of the group.

According to an embodiment of the determination of a reference structural pattern, the method comprises a step of determining a complementary reference structural pattern associated with a group, the complementary reference structural pattern comprising pieces of structural information of primary structural patterns of the group not included in the median reference structural pattern of the group.

The invention also concerns a method of coding hierarchized data, characterized in that it comprises the following steps:
  generating reference structural patterns adapted to represent the hierarchized data according to the method of generating reference structural patterns briefly set forth above;
  determining the pieces of information on difference between the reference structural patterns and the associated hierarchized data; and
  coding the hierarchized data according to the reference structural patterns and the pieces of difference information.

In accordance with this method, reference structural patterns are generated according to the method of the invention described earlier so as to re-code the hierarchized data for the purpose of reducing the coding size of those hierarchized data.

More particularly, after having determined the structures of the hierarchized data (by means of the reference structural patterns), those data are re-coded on the basis of the reference structural patterns. In this way, coding of the pieces of structural information for each item of data is avoided and the coding size of the hierarchized data is thus significantly reduced.

According to a feature, the pieces of information on difference between the reference structural patterns and the associated hierarchized data comprise pieces of structural information and pieces of content information.

The invention also concerns a device for generating reference structural patterns adapted to represent hierarchized data, characterized in that it comprises:
  extracting means for extracting primary structural patterns associated with the hierarchized data, each of the primary structural patterns representing a set of pieces of structural information;
  determining means for determining the degree of use of extracted primary structural patterns on the basis of the number of hierarchized pieces of data able to be represented by said primary structural patterns;
  means for grouping primary structural patterns into groups of primary structural patterns; said grouping being carried out on the basis of the degree of use of at least one primary structural pattern and of a measurement of distance between primary structural patterns; and
  determining means for determining one reference structural pattern per determined group of primary structural patterns, said reference structural pattern being adapted to represent the primary structural patterns of the group associated with it.

Similarly, the invention provides a device for coding hierarchized data, characterized in that it comprises:
  a device for generating reference structural patterns adapted to represent the hierarchized data in accordance with the device briefly set forth above;
  determining means for determining pieces of information on difference between the reference structural patterns and the associated hierarchized data; and
  coding means for coding hierarchized data according to the reference structural patterns and the pieces of difference information.

These devices have the same advantages as the methods they implement and which have been briefly described above.

The present invention also relates to an information storage means, which may possibly be partially or totally removable, which can be read by a computer or a microprocessor storing instructions of a computer program, making it possible to implement the methods as set forth above.

Finally, the present invention relates to a computer program product able to be loaded into a programmable apparatus, comprising sequences of instructions for implementing the methods as set forth above, when that program is loaded and executed by the programmable apparatus.

Other aspects and advantages of the present invention will appear more clearly on reading the following description given solely by way of non-limiting example and made with reference to the accompanying drawings in which:

FIG. 1 presents a simple example of a document containing hierarchized data written in XML language.

Figure 5A:
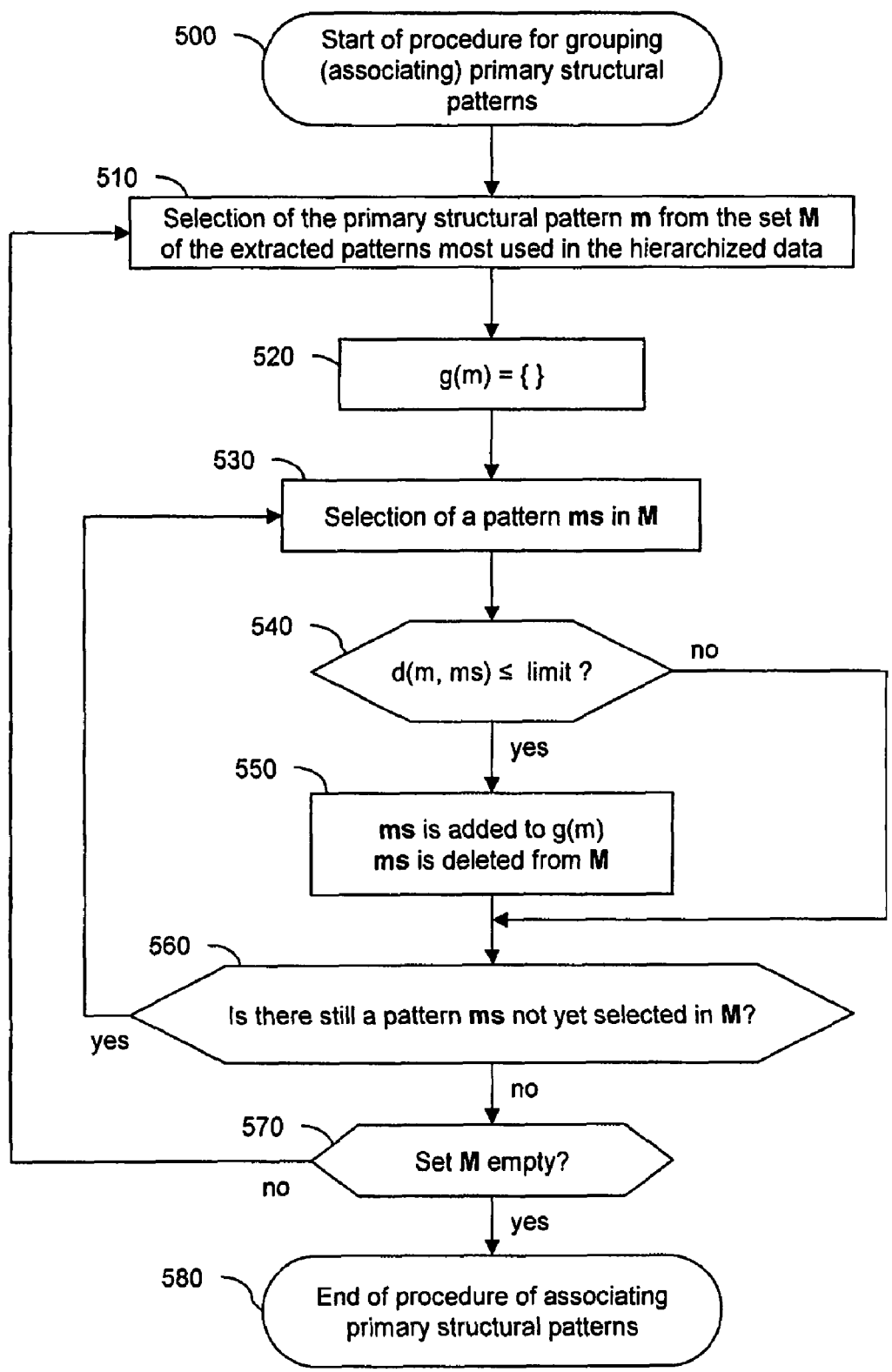
FIG. 5a represents an example of implementation of the grouping of the similar primary structural patterns.
Figures 5B, 5C:
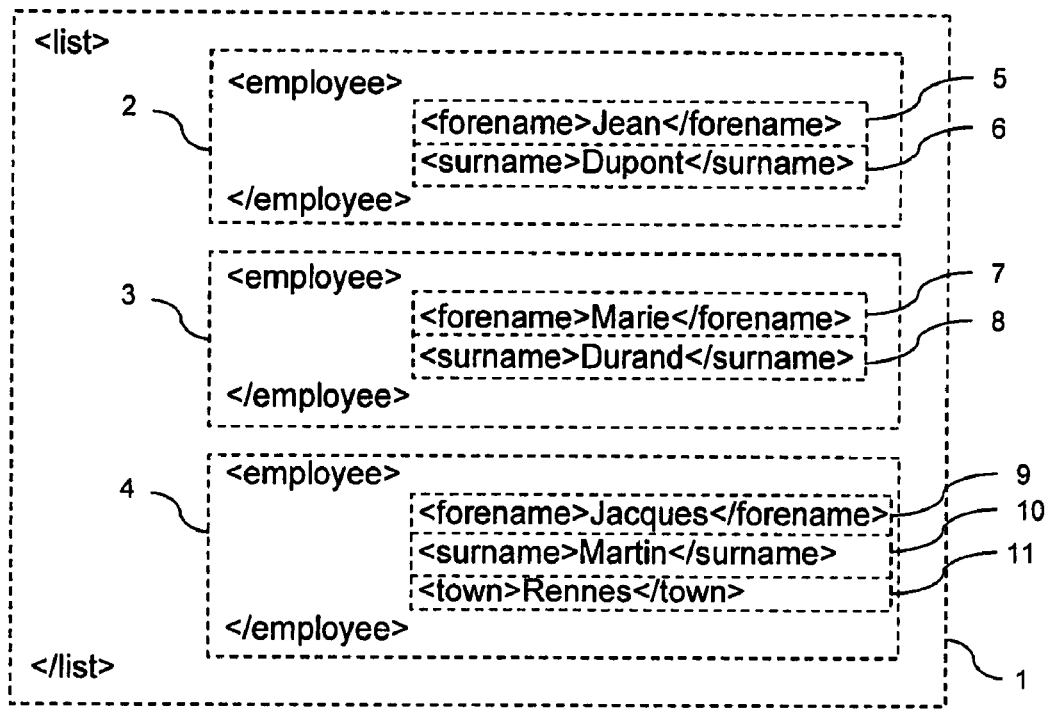

FIG. 5b presents the example document containing hierarchized data written in XML language of FIG. 1 wherein nodes have been identified.

FIG. 5c depicts all possible primary structural patterns of order 1 that can be derived from the hierarchized data of FIG. 5b.

FIG. 5d depicts all possible primary structural patterns of order 2 that can be derived from the hierarchized data of FIG. 5b.

Figure 6:
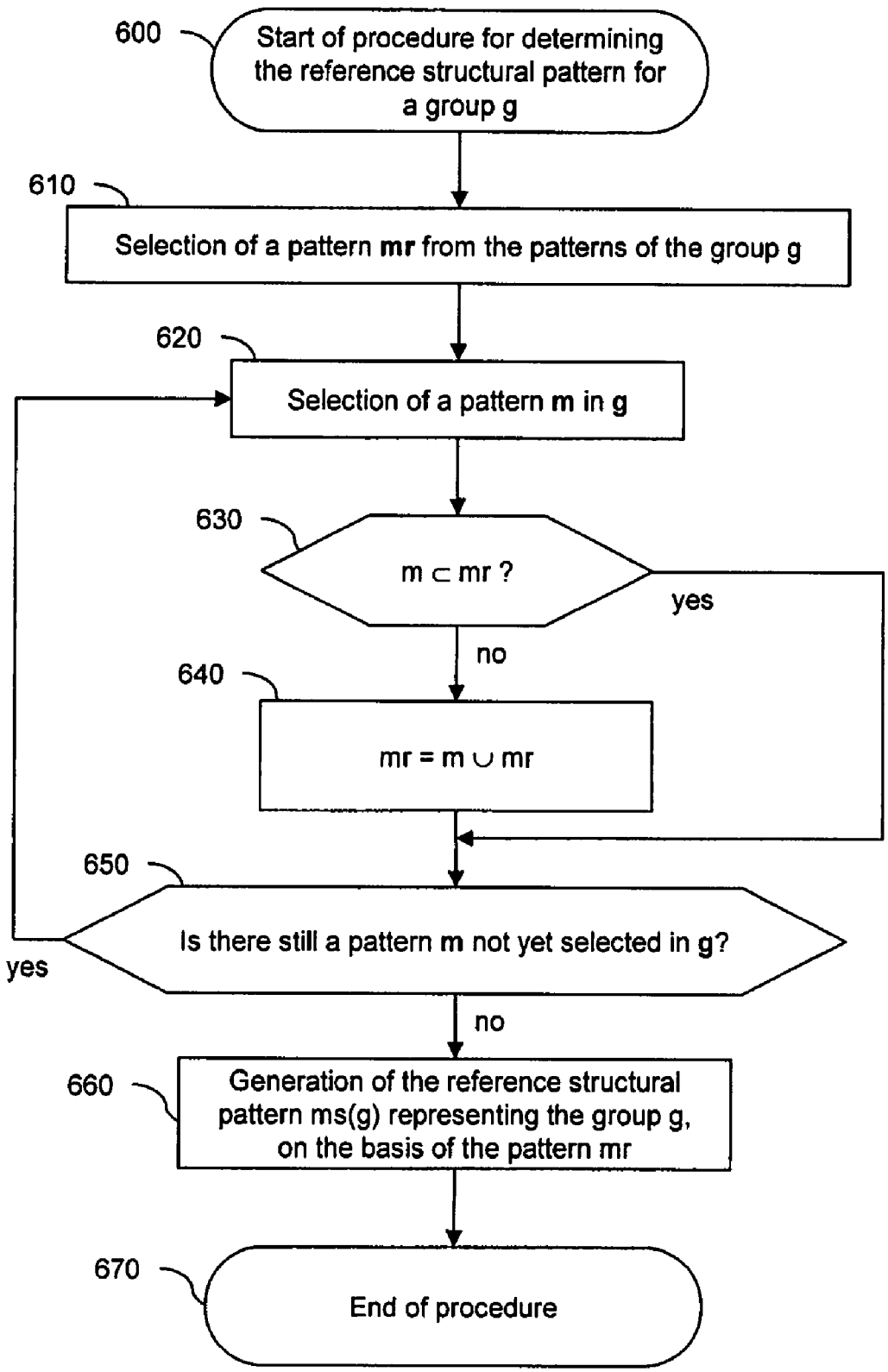

FIG. 6 represents an algorithm for constructing an encompassing reference structural pattern.

Figure 7A:
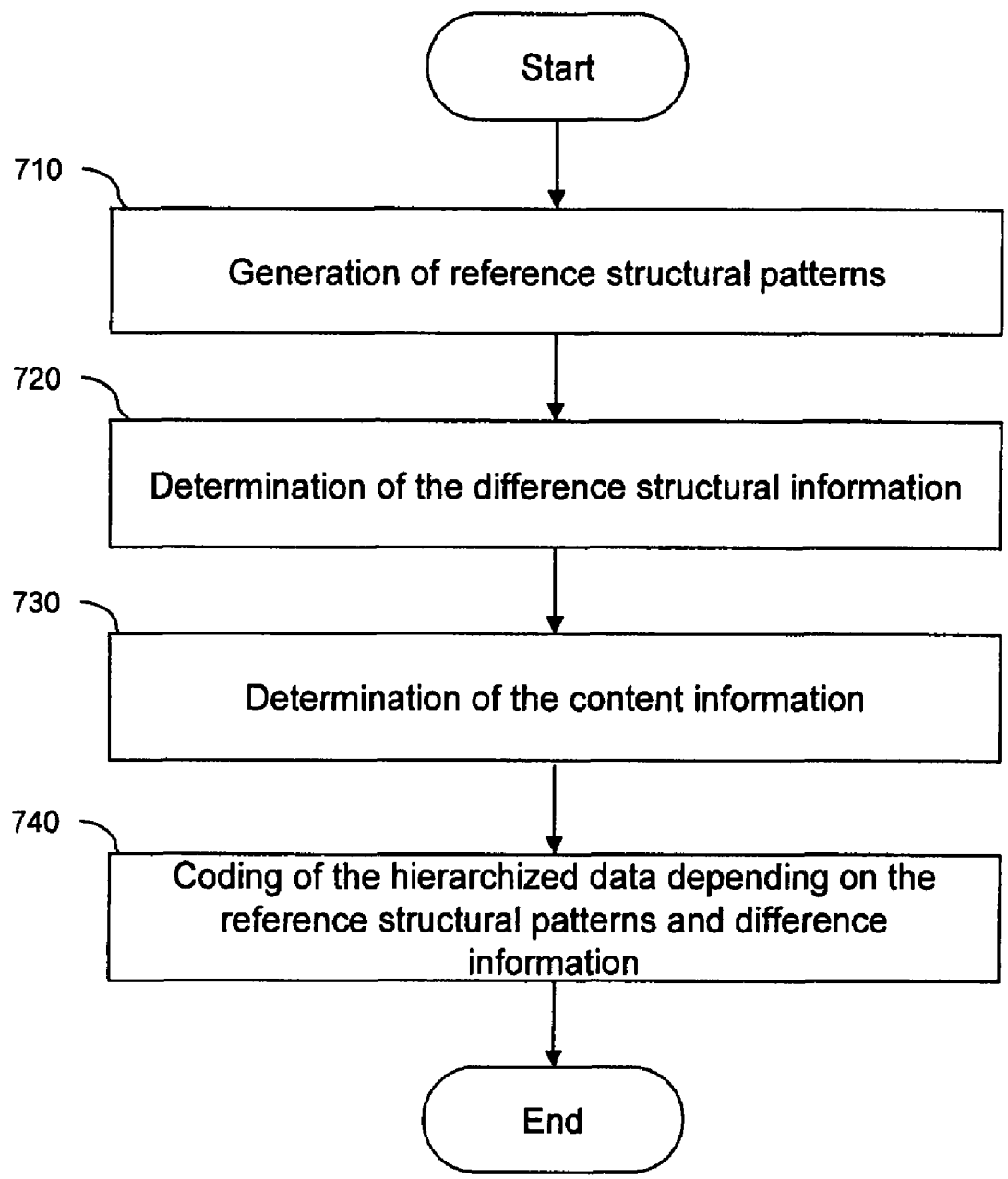

FIG. 7a represents an algorithm for implementing the coding method using the reference structural patterns.

FIG. 7b shows an example of coding rules to encode hierarchized data using a reference structural pattern.

Figure 7C:

FIGS. 7c and 7d show an implementation example of the coding of the hierarchized data of FIG. 1 using reference structural patterns based on the defined coding rules.

Figure 8:
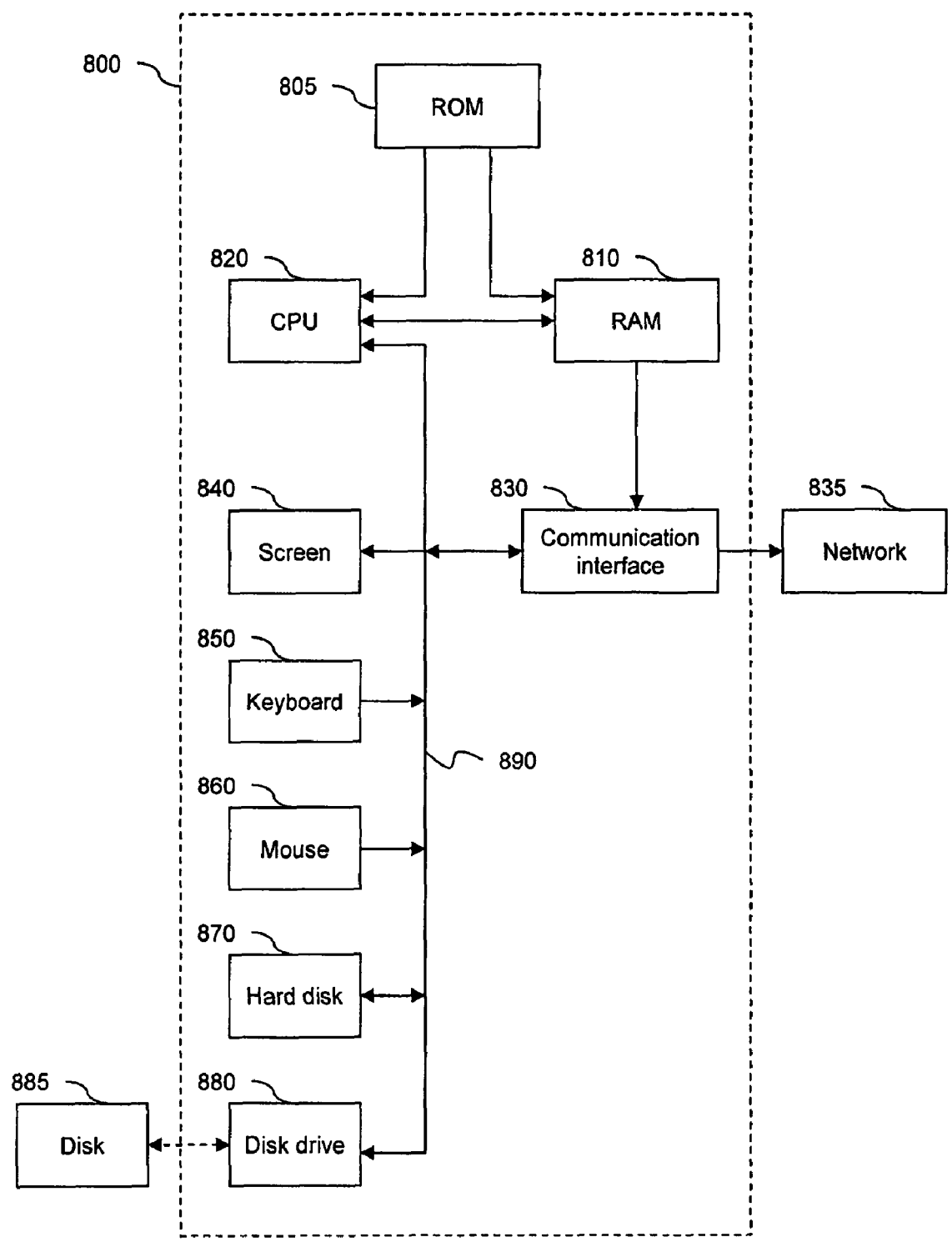

FIG. 8 is a block diagram illustrating a device adapted to implement the present invention.

Figure 9:
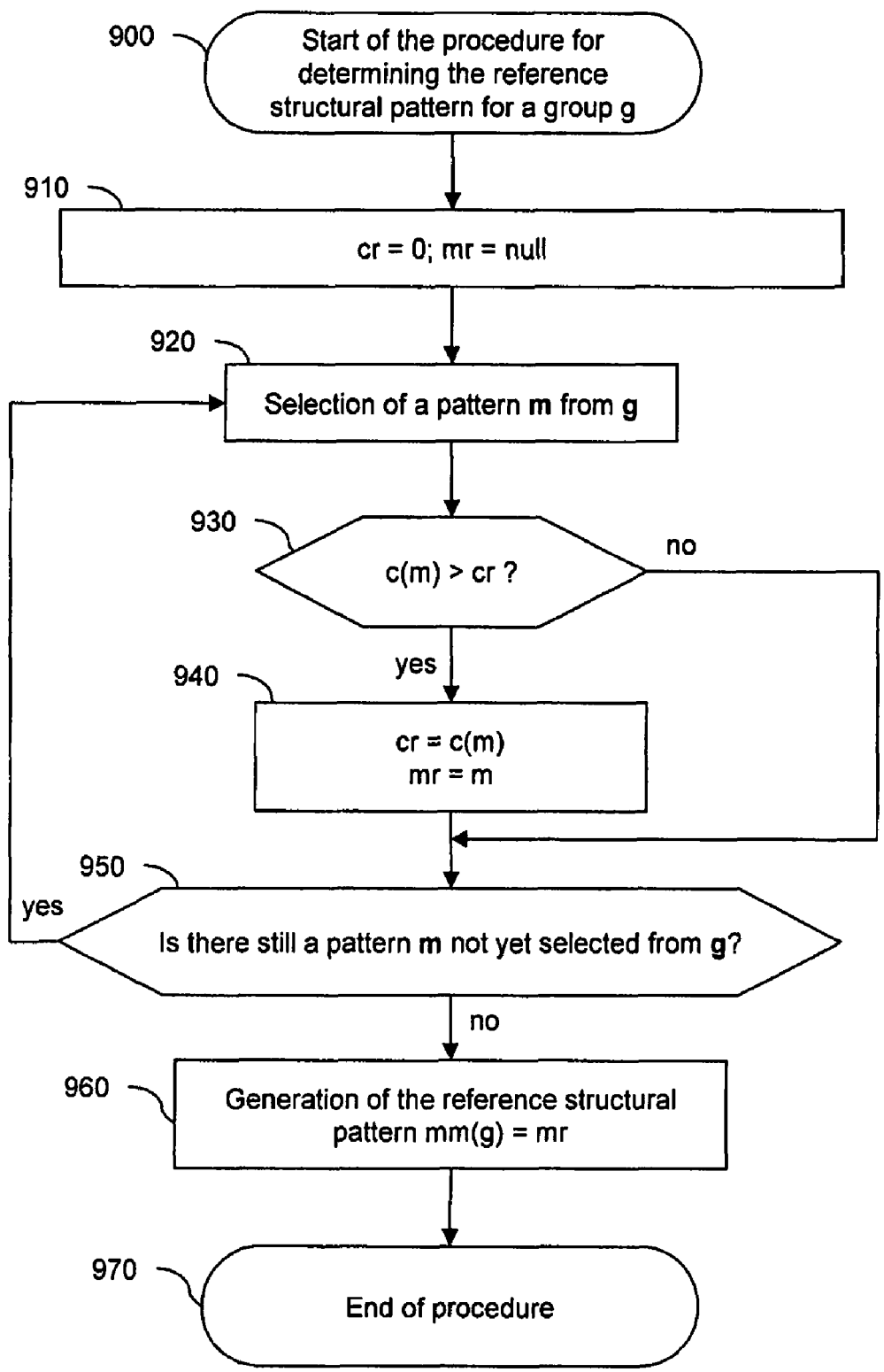

FIG. 9 represents an algorithm for implementing the method of constructing a median reference structural pattern.

Figure 10:
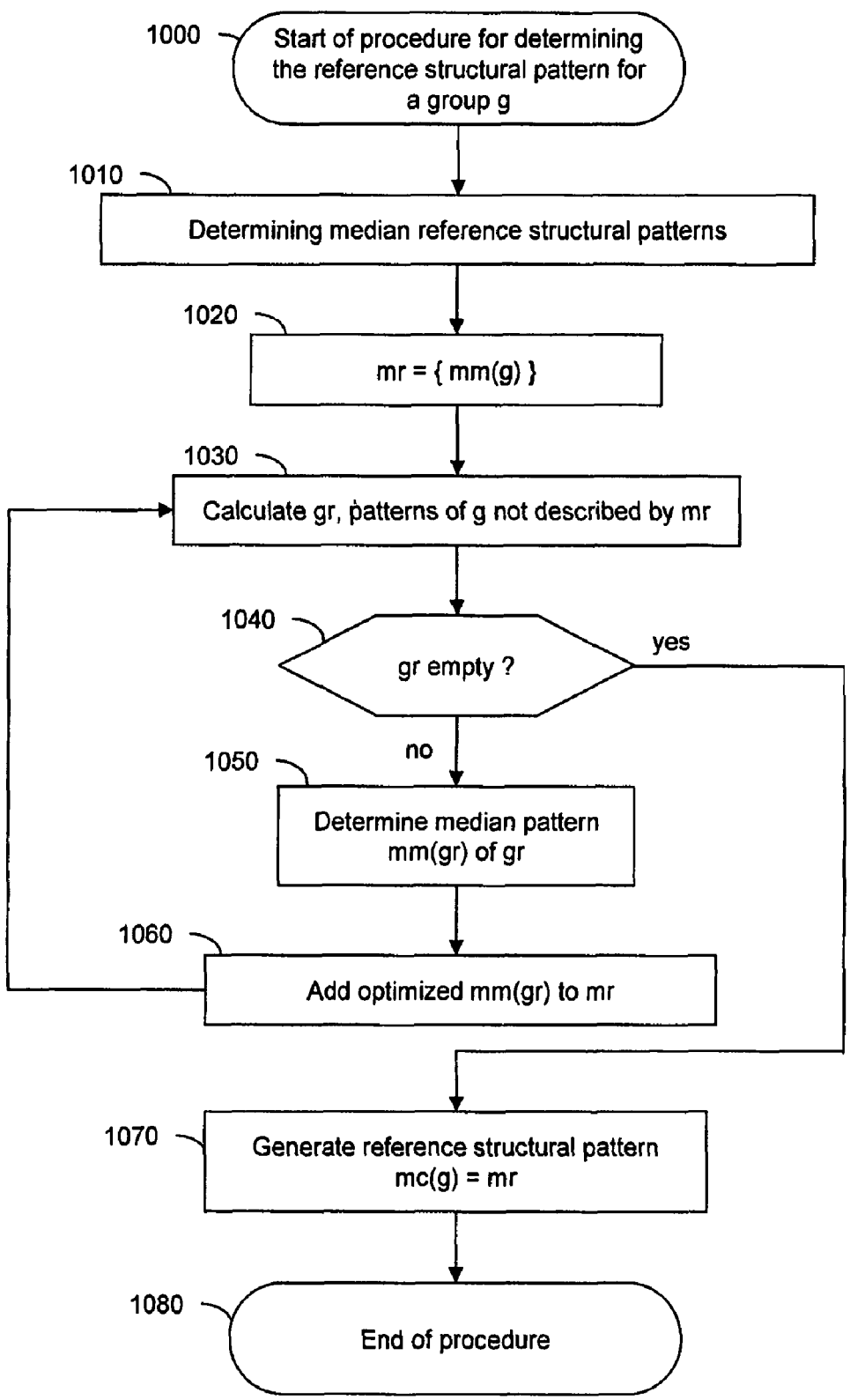

FIG. 10 represents an algorithm for implementing the method of constructing a complementary reference structural pattern.

Figure 2:
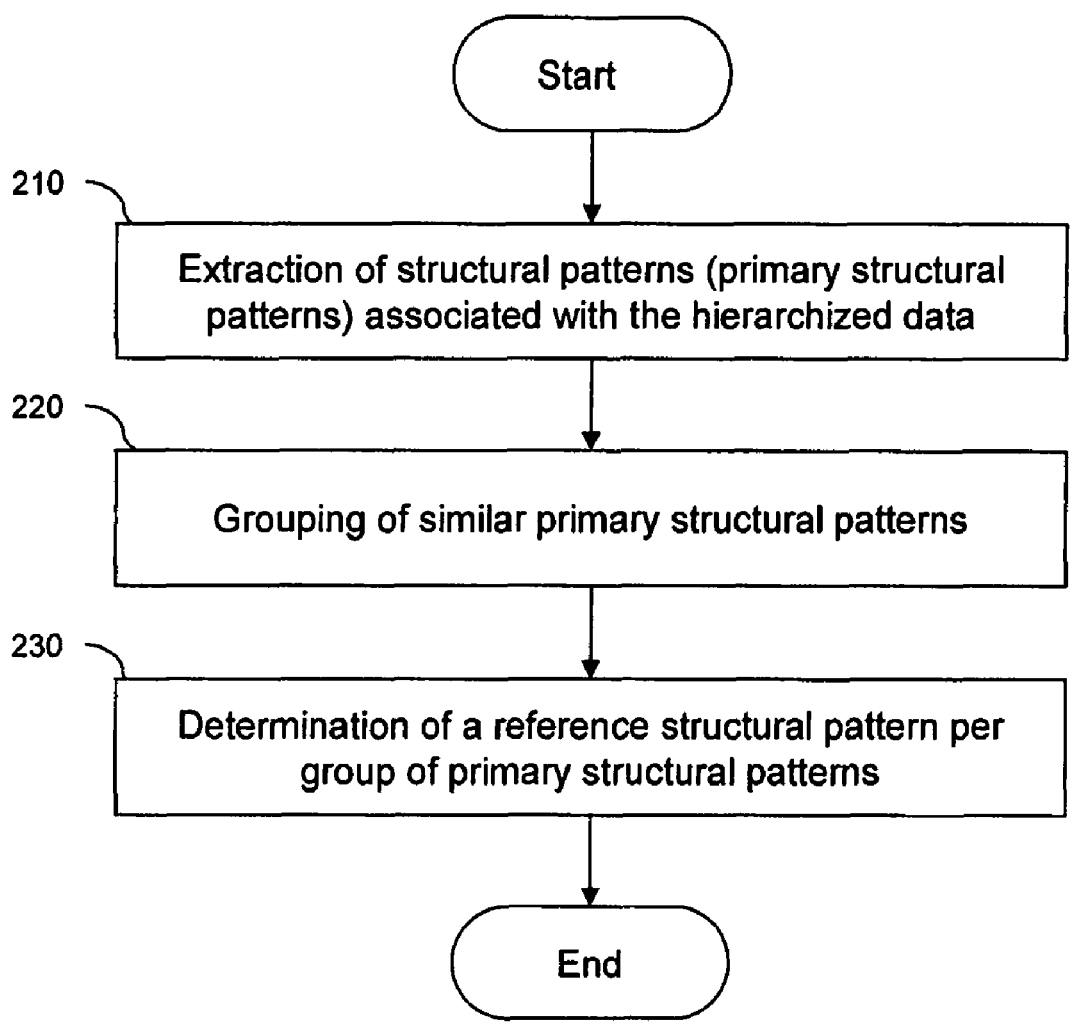
FIG. 2 illustrates an algorithm for generating reference structural patterns according to the invention.

FIG. 2 illustrates an algorithm for generating reference structural patterns according to the invention. The reference structural patterns serve to represent the hierarchized data in optimized manner. Thus, it is not necessary to maintain primary structural patterns representing exactly the different structures present among the hierarchized data, but only a few reference structural patterns which enable all the structures to be represented at reduced cost.

The hierarchized data may be located in one or several documents according to the applications. By applying the steps of the method according to the invention to the hierarchized data of several documents, the reference structural patterns will be optimized for representing the data of all those documents. This does not of course prevent use of the reference structural patterns generated on the basis of the data of a document to represent the data belonging to other documents.

In step 210, structural patterns are extracted from the hierarchized data. These structural patterns are called primary because they reproduce the different structures of the hierarchized data. A primary structural pattern represents a set of pieces of structural information relative to a part of the data tree. The pieces of structural information may for example be: the nature of an item (node or leaf), the number of child items contained in a node, the order of those child items, the type of an item, etc.

By analogy with the tree representation of the hierarchized data, a structural pattern may also be represented in the form of a branching structure of pieces of structural information. The nodes and the associated child items represent in this case the structure of the structural patterns without any piece of content information. In the following portion of the description, the branching representation will be used both for the hierarchized data and for the associated structural patterns.

A structural pattern may extend over one or more hierarchical levels. If the structural pattern extends over a single hierarchical level, it is said that the structural pattern is of order 1. In this case, the pieces of structural information are relative to a node and only to its direct child items. If the structural pattern extends over n hierarchical levels, it is said that the structural pattern is of order n. In this case, the pieces of structural information are relative to a node and to its child items as far as the generation (level) n−1. A pattern of order n does not necessarily include all the possible branches which derive from the root node, but at least one which extends as far as the lower level n−1. Details on the choice of the order and the associated advantages are given later.

Figure 3:
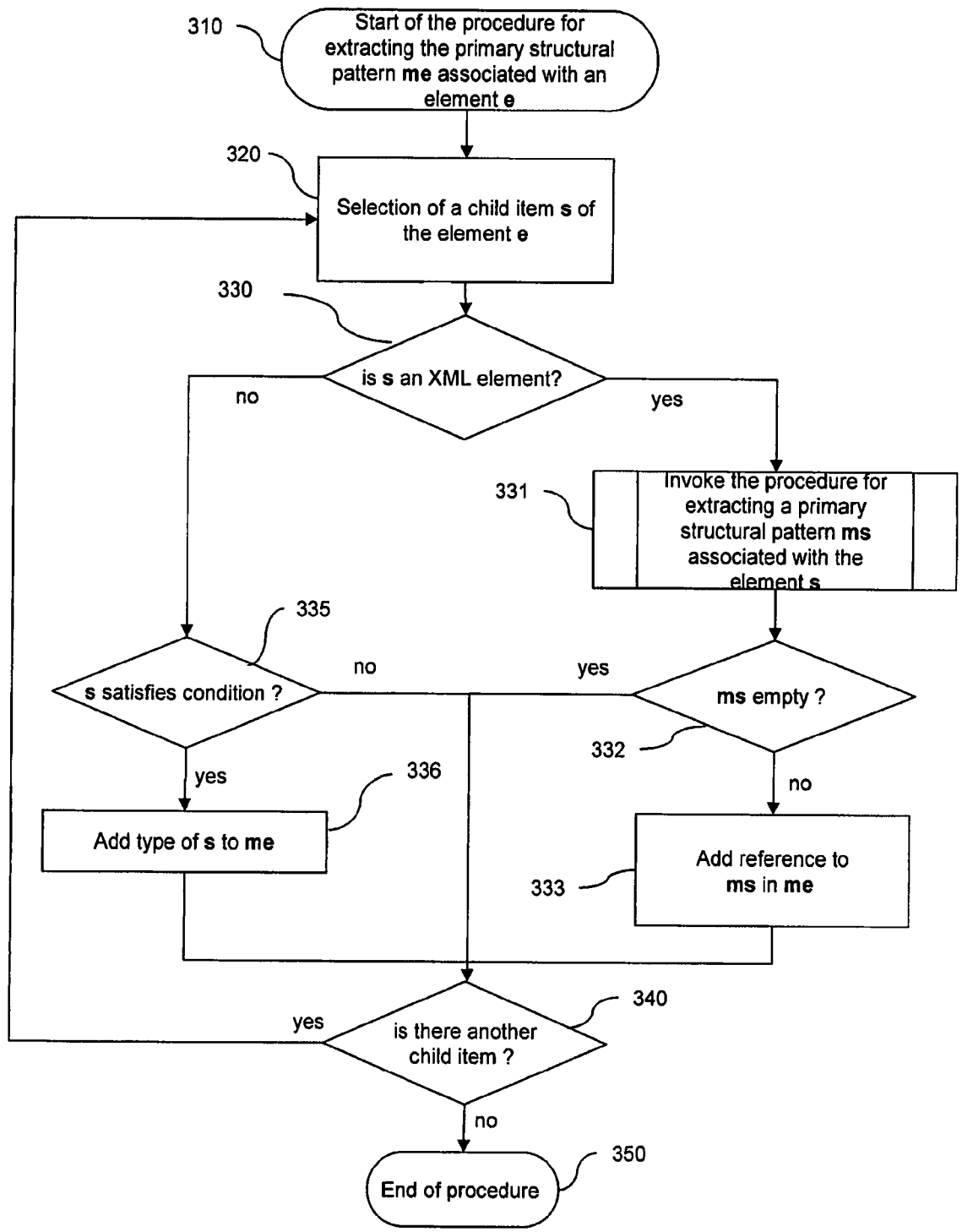
FIG. 3 represents an example of an algorithm enabling the extraction of order 1 primary structural patterns from the data of a document written in XML markup language.
Figure 4:
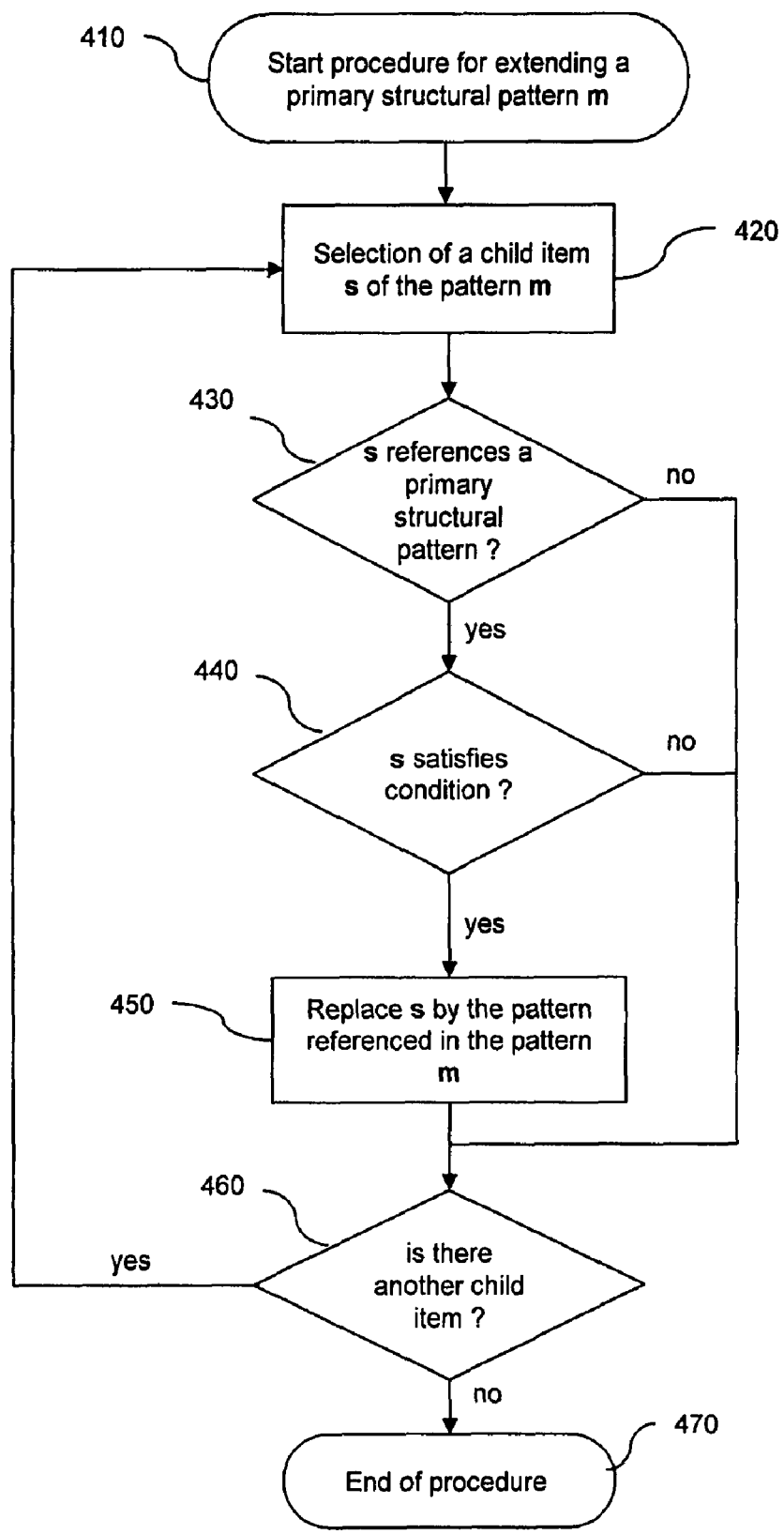
FIG. 4 represents an algorithm for extension of an order 1 primary structural pattern by inclusion of the descriptions of the referenced primary structural patterns.

An example of implementation of this step of extracting primary structural patterns from hierarchized data written in XML language is given by FIGS. 3 and 4.

During step 220, the primary structural patterns which have similarities between them at structural level are grouped together. The degree of similarity is measured quantitatively by the evaluation of a distance which is indicative of the number of pieces of structural information by which two primary structural patterns differ.

When two primary structural patterns are similar, the data that those primary structural patterns represent are structurally close. It is thus advantageous to replace the description of a pattern by the reference to another known pattern (which is similar to it) and by the description of the difference between the actual structural pattern and the reference structural pattern so as to reduce the size of the document.

It should be noted that this method of matching up the primary structural patterns enables optimizations in the description, and consequently in the processing operations applied to the data such as coding or searching. These optimizations are not permitted by the methods of the state of the art. To be precise, according to the methods of the state of the art, an element of "manager" type (not shown in FIG. 1) containing, for example, exactly the same child items ("surname" and "forename") as the element "employee" will not be associated with the latter since the two elements are of different type. Yet, these two elements only have the type of the element as structural difference, that is to say the identifier of the node "employee"/"manager". According to the invention, these two elements may be considered as similar.

Several variant embodiments may be envisaged to form the groups of similar structural patterns. Examples of implementation of this step are described later, and in particular with reference to the algorithm of FIG. 5.

During step 230, a reference structural pattern is determined for representing the primary structural patterns of each group. Due to the similarities existing between the primary structural patterns of the same group, the same structural pattern may be used to represent all those patterns. This pattern is termed reference structural pattern.

The reference structural pattern may be chosen from the primary structural patterns of the group or constructed on the basis of those primary structural patterns.

Examples of implementation of this step are described later, and in particular with reference to the algorithm of FIG. 6.

FIG. 3 illustrates an example of an algorithm enabling the extraction of order 1 primary structural patterns from the data of a document written in XML markup language.

This algorithm is executed recursively starting with the root element of the XML document. The procedure is thus launched at step 310 with that root element.

At step 320, a child item is selected, then a test is carried out at step 330 to know whether that item is itself an XML element or not.

If the item is itself an element, the procedure of pattern extraction for that child item is once again invoked (step 331). The extraction procedure yields a reference to the pattern so created associated with the child item, that reference is added to the pattern of the XML element at step 333.

Optionally, if the child item is an element which contains no other child item (positive alternative of the test of step 332), no reference to the (empty) pattern associated with the child element is added to the pattern of the parent element.

In the negative alternative of the test of step 330, if the selected child item is not an element, the type of that item is added to the pattern associated with the parent element.

Optionally, a condition (step 335) may be added relative to the inclusion of the type of the child item in the pattern. This condition may also apply (case not represented on the algorithm) to the inclusion of a reference to a pattern.

The condition relative to the inclusion of a sub-item in the primary structural pattern makes it possible to adapt that pattern to particular processing operations. For example, if the object of the creation of the patterns is to identify all the elements having a "forename" identifier, the condition for inclusion will be that the item must be an element and that either this element has "forename" as identifier, or it is non-empty. Thus, structures of reduced primary structural patterns are obtained, but that are particularly adapted to the envisaged processing operations.

Step 340 consists of verifying whether there is another child item s to process or not.

If there remains at least one other child item to process, the algorithm continues at step 320 already described, so as to process the following child item.

In the opposite case, the algorithm terminates at step 350 and yields the created primary structural pattern me associated with the XML element e.

When all the child items of a parent element are themselves elements, the order 1 structural pattern associated with the parent element will only contain references to patterns for its child items.

When several primary structural patterns identified are identical, it suffices to keep only one copy for the later processing operations.

An example of determining patterns of order 2, in a variant embodiment, is obtained by first of all extracting order 1 primary structural patterns according to the algorithm of FIG. 3, then an extension of those primary structural patterns by an additional hierarchical level.

This embodiment is illustrated with reference to FIG. 4 which presents an algorithm enabling the reference to a primary structural pattern to be replaced by the actual description of that primary structural pattern.

The procedure is launched at step 410 with a primary structural pattern m. In step 420, a child item s of the pattern m is selected, and a first test is carried out in step 430 to verify whether that child item s references a primary structural pattern. If this is not the case, the following child item is proceeded to if it exists (test of step 460 and step 420). If it is the case, a second test is carried out in step 440 to know whether a predetermined condition is satisfied.

The predetermined condition depends on the application envisaged. For example, to reduce the number of patterns, it may be worthwhile only extending the patterns of which the child items of second generation (the children of the child items) are of simple type, that is to say are not nodes. In the example of the data of FIG. 1, the patterns associated with the elements "surname" and "forename" may be directly inserted into the primary structural pattern associated with the element "employee", the elements "surname" and "forename" representing items which only contain leaf sub-items of text type. Another example consists of including in a pattern all the patterns to which it refers and which are not used by another pattern.

Thus, further to the test of step 440, if the condition is not satisfied, the following child item is proceeded to if it exists (test of step 460 and step 420). If the condition is satisfied, the reference to the pattern s is replaced by the description of that pattern in step 450.

Step 460 consists of verifying whether there is another child item that has not been processed. If that is the case, the algorithm continues at previously described step 420. In the opposite case, the algorithm terminates at step 470.

Other variant embodiments may be envisaged to extend an order 1 pattern to an order n pattern. More particularly, on the same principle as that of FIG. 4, the child items of each pattern which reference another pattern may be replaced by the description of the referenced pattern, this being done recursively until the desired depth is obtained.

The use of a primary structural pattern of order n is particularly advantageous when the item of the lowest level of the pattern represents a simple type, and not a reference to a pattern.

FIG. 5a presents an example of implementation of step 220 of the method of FIG. 2 to group the primary structural patterns that are similar to each other.

The algorithm commences at step 500. This step is followed by a step 510 in which the "most used" primary structural pattern m in the hierarchized data structure is selected from the set M of the patterns extracted previously, according to the algorithms of FIGS. 3 and 4 for example. The selection of such a primary structural pattern is described in more detail later.

The selection of the most used primary structural pattern is particularly advantageous, since this makes it possible to give priority to processing the structural patterns participating the most in the description of the document. Thus the parts of the document having the most frequent structures will be described with greater precision than the others. This selection is particularly advantageous in the case of XML document coding, since it makes it possible to code the parts of the document having the most frequent structures more effectively.

This involves a low coding cost since the difference between the data structure and the corresponding primary structural pattern only represents content information.

At step 520, a group g(m) is first of all initialized to the empty set. At the end of the execution of the algorithm this group g(m) will contain the pattern m and, possibly, patterns similar to it. If no similar pattern is found, the group g(m) will only contain a single element which is the pattern m itself.

At step 530, a pattern ms is selected from the patterns of the set M, then the distance between that pattern ms and the pattern m is calculated (d(m, ms)). This distance is next compared to a predetermined threshold, named limit value, at step 540.

As soon as variant, this predetermined threshold may depend on the number of primary structural patterns remaining in the set M, the threshold increasing when that number of remaining primary structural patterns diminishes. Thus, the groups constituted for the most used primary structural patterns will only contain primary structural patterns very close to each other, whereas it will be possible for the groups constituted for the least used primary structural patterns to contain primary structural patterns relatively far from each other.

If the primary structural patterns m and ms are sufficiently close, that is to say if the distance d(m, ms) is less than or equal to the limit value, the algorithm continues at step 550, otherwise it continues directly at step 560.

In step 550, the pattern ms which has been identified as sufficiently close to the pattern m by the distance calculation, is added to the group g(m) associated with m. The pattern ms is also deleted from the set M in order not to be taken again in other groups.

Step 560 consists of verifying, by means of a test, whether there is another primary structural pattern ms in the set M that is unselected. If the test is positive, the algorithm returns to step 530 for the selection of a new pattern ms. Otherwise, the algorithm continues at step 570.

Step 570 consists of verifying, by means of a test, whether any patterns remain in the set M to be grouped. If the test is positive, the algorithm continues at step 510 for the formation of a new group. Otherwise, the algorithm terminates at step 580.

Any primary structural pattern belonging to the group g(m) is necessarily at a distance less than the limit value of the primary structural pattern m (the pattern m is then referred to as pattern associated with the group g(m)). It is however to be noted that any two patterns of the group may be at a distance greater than that limit value.

In a variant embodiment of the method of grouping the patterns, it is possible to choose groups of which the primary structural patterns constituting each group are all situated, considering them two at a time, at a distance less than or equal to the predetermined limit value.

The distance d(m, ms) makes it possible to quantitatively measure the similarity between two structural descriptions. When two primary structural patterns are close, this means that one primary structural pattern may be replaced by the other in the description of the data which is associated with them.

The distance between two primary structural patterns is very great, or even infinite, if the two primary structural patterns do not correspond to XML elements having a similar structure.

It will be noted that the distance used depends on the envisaged application. Similarly, the limit used to compare that distance depends on the envisaged application and the distance used.

An example of a method for calculating the distance between two primary structural patterns consists of determining the number of pieces of structural information which must be added, deleted and modified with respect to a pattern to obtain the other pattern. As stated earlier, the pieces of structural information may be of the item type (identifier of the element in the case of a compound type), the number of child items contained in a node, the order of those child items, etc.

Most often, when the primary structural patterns are very similar (same type of node, same order of the items or the order is not involved), the distance calculation is reduced to determining the minimum number of additions of items and/or of deletion of items and/or of modification of items to be made to pass from one primary structural pattern to the other.

It is to be noted that the child item of a pattern represents the type of the child item of the node that the pattern represents.

Consider for example the hierarchized data written in XML language of FIG. 1. This data is reproduced in FIG. 5b where important nodes of the data tree have been identified. The node 1 ("list" element) is located at the highest hierarchical level and represents the root node. This node contains three child nodes 2, 3 and 4 representing three "employee" elements. Each "employee" element contains in turn a "forename" element (respectively 5, 7, 9) and a "surname" element (respectively 6, 8, 10). The last "employee" element contains in addition a "town" element (11).

From the hierarchized data of FIG. 5b, primary structural patterns can be extracted. In this example, the extracted primary structural patterns are of order 1 and 2.

FIG. 5c depicts all possible primary structural patterns of order 1 that can be extracted from the hierarchized data of FIG. 5b.

The primary structural pattern m1 corresponds to a node representing a "list" element and comprising three child items representing pointers to other unspecified primary structural patterns. This pattern is extracted from node 1 of FIG. 5b.

The primary structural pattern m2 corresponds to a node representing an "employee" element and comprising two child items representing pointers to other unspecified primary structural patterns. This pattern is extracted from node 2 of FIG. 5b. An identical pattern is also extracted from node 3 of FIG. 5b and is then merged with pattern m2. Therefore, this primary structural pattern m2 has two instances (nodes 2 and 3).

The primary structural pattern m4 corresponds to a node representing an "employee" element and comprising three child items representing pointers to other unspecified primary structural patterns. This pattern is extracted from node 4 of FIG. 5b.

The primary structural patterns m5, m6, and m11 correspond to a node representing respectively a "surname", a "forename", and a "town" element and comprising a child item representing a textual content. These patterns are extracted respectively from the nodes 5, 6 and 11 of FIG. 5b. These patterns also represent the structure of the nodes 7 to 10 of FIG. 5b.

According to the first calculation method, the distance between the primary structural patterns (of order 1) m1 and m2 (d(m1, m2)) is equal to 3 because "list" needs to be deleted, "employee" needs to be added and one "pointer to pattern" needs to be deleted to obtain m2 from m1. In a variant, if changing "list" by "employee" is done in one step (one specific code for the substitution), d(m1, m2) may be equal to 2.

Similar distance calculations can be performed for each remaining pair of structural patterns:

$$d(m2,m4)=1;$$

$$d(m5,m6)=2, \text{ etc.}$$

FIG. 5d depicts all possible primary structural patterns of order 2 that can be extracted from the hierarchized data of FIG. 5b.

The primary structural pattern m1 corresponds to a node representing a "list" element and comprising three child items representing "employee" elements, the first two containing two pointers to unspecified primary structural patterns and the last one containing three pointers to unspecified primary structural patterns. This pattern is extracted from node 1 of FIG. 5b.

The primary structural pattern m2 corresponds to a node representing an "employee" element and comprising two child items. The first child item represents a "forename" element comprising a child item of text type. The second child item represents a "surname" element, comprising a child item of text type. This pattern is extracted form the node 2 of FIG. 5b. An identical pattern is also extracted from node 3 of FIG. 5b and is merged with pattern m2.

The primary structural pattern m4 corresponds to a node representing an "employee" element and comprising three child items. The first child item represents a "forename" element comprising a child item of text type. The second child item represents a "surname" element comprising a child item of text type. The third child item represents a "town" element comprising a child item of text type. This pattern is extracted from node 4 of FIG. 5b.

According to the first calculation method, the distance between the primary structural patterns (of order 2) m1 and m2 (d(m1, m2)) is equal to 16, however and d(m2, m4)=2.

The small distance between the primary structural pattern m2 and the primary structural pattern m4 is indicative of the similarly between these two patterns. It indicates also that the use of primary structural pattern of order 2 provides a good representation level of the hierarchized data.

According to a second method of calculating the distance, the latter may also differently take into account, by different weightings, the additions, deletions or modifications of items.

However, according to this second method of calculation, the distance between the primary structural pattern m1 and the primary structural pattern m2 may be different from the distance between the primary structural pattern m2 and the primary structural pattern m1 (d(m1, m2)≠d(m2, m1)).

In this case, the associations created between pairs of primary structural patterns are asymmetrical. This is because a primary structural pattern m1 may be close to a primary structural pattern m2 (d(m1, m2)≦limit), without the primary structural pattern m2 being close to the primary structural pattern m1 (d(m2, m1)≦limit).

This means that the primary structural pattern m1 may be replaced by the primary structural pattern m2 in the description of the structure of the document, without it being possible for the primary structural pattern m2 to be replaced by the primary structural pattern m1.

It is to be noted that the algorithm of FIG. 5a for grouping the primary structural patterns functions in the case of asymmetrical distances. This is because each group is associated with a given primary structural pattern. The distances are calculated between each primary structural pattern of the group and the pattern associated with the group, that is to say that the associated pattern may replace each primary structural pattern of the group, without it necessarily being possible for the associated pattern to be replaced by the different primary structural patterns of the group.

In a variant embodiment, the calculation of the distance is weighted by the degree of use of a pattern. Consider a group of primary structural patterns g(m) associated with the primary structural pattern m. As described previously, any primary structural pattern r of the group g(m) is at a distance d(m, r) from the pattern m. Yet, it may be particularly advantageous to consider a weighted distance d(m, r, u(r)) equal to d(m, r)×A×u(r), where u(r) is the degree of use of the pattern r and A is a weighting parameter. Thus, the more the pattern r is used, the more the weighted distance increases and r consequently "moves away" from the pattern m. This favors the creation of a group g(r) associated with r that is different from g(m), even if there are few structural differences between m and r since there are many occurrences of the pattern r in the hierarchical data. Conversely, the less the pattern r is used, the more the distance diminishes and r "moves towards" the pattern m. This favors the representation of the pattern r by the pattern m even if there are numerous structural differences since there are very few occurrences of the pattern r in the hierarchical data. In either case, the coding costs are lowest.

For example, considering the primary structural patterns of order 2 of FIG. 5d, and the group g(m2)={m2}. A weighted distance d(m2, m4 u(m4)) can be considered for m4 to test if m4 can be included in g(m2). By assuming the weighting parameter A=0.5, d(m2, m4, u(m4))=2×0.5×1=1, which makes m4 close to the group of m2 (and thus can be added to the group) because m4 is used only once (u(m4)=1). If m4 was used in many times, the distance would be greater and m4 would not be included in the group g(m2). If the weighted distance is applied similarly to m1, the result is equal to 8 which indicates that there are too many differences between m1 and m2, even if m1 is used once.

At step 510 of FIG. 5, the primary structural pattern m "most used" in the hierarchized data structure is selected from the set M of the extracted patterns.

In the particular case of the primary structural patterns of order 1, the selected pattern m is that of which the structure corresponds to the highest number of nodes.

In the case of a document written in XML language, the degree of use u(m) of a pattern m corresponds to the number of XML elements able to be represented by the primary structural pattern m.

A calculation method for this value consists of calculating, for each primary structural pattern m, the number of elements of the XML document directly represented by that primary structural pattern.

According to an embodiment, this value is obtained directly at the time of the extraction of the primary structural patterns carried out in particular by means of the algorithm of FIG. 3.

According to a variant embodiment, for each primary structural pattern m, the value of the degree of use u(m) is calculated by summing the number of elements directly represented by the primary structural pattern m and the number of elements directly represented by primary structural patterns close (situated at a distance less than the limit value) to the primary structural pattern m, that is to say by the number of elements that can be represented by the primary structural pattern m.

However, according to this method, only the primary structural patterns situated in the set of the primary structural patterns M in course are taken into account.

All the preceding variant embodiments for calculating the degree of use of a primary structural pattern associated with an XML element may be extended to a primary structural pattern of order n.

According to another variant embodiment of the step 510 of FIG. 5, the selected primary structural pattern is any pattern from the set M of the extracted primary structural patterns.

This variant embodiment is however advantageous in taking, as distance measurement for forming the groups, a distance weighted by the degree of use of the patterns as described earlier.

According to a variant embodiment of the step of grouping primary structural patterns, the primary structural patterns only representing a few structures from the hierarchized data are not considered. In this case, step 570 is modified to verify whether the number of primary structural patterns remaining in the set M is less than a predetermined threshold. If this is the case, the algorithm terminates. Otherwise, the algorithm continues at step 510.

According to another variant, step 570 is modified to verify whether the degree of use of the most used primary structural pattern remaining in the set M is less than a predetermined threshold. If this is the case, the algorithm terminates, otherwise, the algorithm continues at step 510. This verification makes it possible not to group the least used primary structural patterns and only to keep those representing the structure of a sufficient number of parts of the document. This variant is particularly advantageous for the coding of a document.

In this case, the concept of patterns will not be used to represent the corresponding data structures.

For each group identified, a structural pattern is determined to serve as a reference for all the patterns of the group. The reference structural pattern is the pattern which is used in place of all the other patterns of the group in the processing operations applied to the hierarchized data.

In a first embodiment of the invention, the reference structural pattern of a group is chosen as being the pattern associated with the group. The advantage of this embodiment is that the associated pattern is by construction the closest pattern to all the other patterns of the group.

In a second embodiment, the reference structural pattern of a given group is constructed on the basis of the primary structural patterns of the group by taking the combination (or "aggregate") of all the pieces of structural information of those patterns. The pattern so constructed is said to be the encompassing reference structural pattern.

It is also possible to construct an encompassing reference structural pattern by forcing there to be a primary structural pattern encompassing all the others at the time of the step of grouping the primary structural patterns.

This may be achieved by redefining the distance d(m, ms) as a unilateral distance conditioned by an inclusion of the pattern ms in the pattern m. Thus, if the pattern ms is not included in the pattern m, the distance is considered as very great or infinite. If the pattern ms is included in the pattern m, the distance between those patterns is calculated according to the methods described earlier. All the patterns ms associated with the pattern m will be encompassed within the pattern m, and it then suffices to choose the pattern m as reference structural pattern for the group g(m).

A pattern m1 is considered as encompassed within another pattern m2, when the pattern m1 may be obtained from the pattern m2 by deleting certain pieces of structural information from the pattern m2. This means that all the pieces of structural information of the pattern m1 are found in the pattern m2 in the order in which they are found in the pattern m1.

For two structural patterns m1 and m2, it is possible to construct their combination, that is to say a structural pattern encompassing both the structural pattern m1 and the structural pattern m2 and which is the smallest possible. For this, it suffices to take all the pieces of structural information of the structural pattern m1 and add thereto the pieces of structural information of the structural pattern m2 that are not found in the structural pattern m1, while respecting the order of those pieces of structural information.

It is to be noted that for certain applications, the order of the pieces of structural information is of no importance. In this case, the pieces of structural information in the structural patterns may be sorted by category and by lexicographical order in order to simplify the comparisons of the structural patterns and the calculations on the structural patterns.

The use of encompassing reference structural patterns is particularly advantageous for coding applications since it makes it possible to have higher rates of compression. This use is also advantageous for search applications since the encompassing reference structural patterns make it possible to simplify the search for items.

An example of an algorithm for constructing an encompassing reference structural pattern is described with reference to FIG. 6.

The algorithm commences at step 600. This step is followed by the step 610 consisting of choosing a first primary structural pattern mr belonging to the group g.

The following step (step 620) consists of selecting a second primary structural pattern m of the group g.

The algorithm continues with the comparison, at step 630, of this selected primary structural pattern m with the primary structural pattern mr.

If the primary structural pattern mr encompasses the primary structural pattern m, that is to say if the primary structural pattern mr comprises all the child items of the primary structural pattern m in the same order, the algorithm continues at step 650 described later.

In the opposite case, that is to say if the primary structural pattern mr does not comprise all the child items of the primary structural pattern m, the algorithm continues at step 640 during which the primary structural pattern mr is updated by generating a primary structural pattern which comprises the child items of the primary structural pattern m and of the primary structural pattern mr (step 640).

This step is followed by the step 650 consisting of verifying by means of a test whether there is another primary structural pattern which has not been processed.

In the affirmative, the algorithm continues at step 620 already described.

In the opposite case, the algorithm continues at step 660 consisting of generating the reference structural pattern ms(g) representing the group g, on the basis of the pattern mr. The reference structural pattern ms(g) may be, for example, equal to mr.

Other variants for constructing the reference structural patterns exist such as the median reference structural patterns and the complementary reference structural patterns.

An example of an algorithm for constructing a median reference structural pattern is described with reference to FIG. 9.

The algorithm commences at step 910 with the initialization of a variable cr to a null value and a variable mr to a null value. In practice, this variable cr is initialized to a very high value. The variable mr corresponds to the determination of the best candidate among the primary structural patterns for determining the median reference structural pattern. The variable cr corresponds to the measurement of representativeness of that best candidate. The higher that measurement, the more the candidate is representative of the whole of the group.

The following step (step 920) consists of selecting a primary structural pattern m in the current group g.

The algorithm continues with the calculation of the representativeness measurement c(m) for that pattern m. This representativeness measurement corresponds to the sum of a measurement of proximity of that pattern m to the other patterns of the group. In practice, this proximity measurement is inversely proportional to the distance between two patterns.

As a variant, this sum may be weighted by the number of elements of the XML document directly represented by each of the primary structural patterns of the group.

The formula for calculating the representativeness measurement c(m) may thus be:

$$c(m) = \sum_{k \in g, k \neq m} \frac{n(k)}{1 + d(m, k)} + n(m)$$

where n(k) is the number of nodes associated with the pattern k.

As a variant the calculation of c(m) may be identical to the calculation of u(m).

The algorithm continues with the comparison of the measurement of representativeness c(m) with the measurement of representativeness cr of the primary structural pattern mr at step 930.

If the pattern m is more representative than the pattern mr, that is to say if c(m) is greater than cr, then the algorithm continues at step 940.

Step 940 consists of updating the variables cr and mr. The variable mr takes the pattern m as its value, whereas the variable cr takes the measurement of representativeness c(m) of the pattern m as its value.

In all cases, the algorithm continues at step 950 which consists of verifying by means of a test whether there is another primary structural pattern of the group g which has not been processed.

In the affirmative, the algorithm continues at step 920 already described.

In the opposite case, the algorithm continues at step 960 consisting of generating the reference structural pattern mm(g) representing the group g, on the basis of the primary structural pattern mr.

The algorithm terminates at step 970.

An example of an algorithm for constructing a complementary reference structural pattern is described with reference to FIG. 10.

The algorithm commences at step 1010 with the determination of the median reference structural patterns as described with respect to FIG. 9.

The algorithm continues at step 1020 by the initialization of the variable mr to a value consisting of a set of patterns constituted by a single element which is the median reference structural pattern mm(g) of the group g. This variable corresponds to the set of the reference structural patterns for g.

The following step (step 1030) consists of calculating the set of patterns gr, the set of the patterns of the group g not fully described by the reference structural pattern mr. This step consists of determining all the patterns of the group g which are not encompassed in the combination of several patterns of the set of reference structural patterns mr.

In practice, this step consists of calculating the combination of all the patterns of the set of reference structural patterns mr, then of verifying for each pattern of g whether that pattern is encompassed within that combination. If that pattern is not encompassed in the combination so calculated, it is added to the set of patterns gr.

The algorithm continues at step 1040 consisting of verifying whether the set of patterns gr is empty. If that is the case, the algorithm continues at step 1070 described later.

In the negative, the algorithm continues at step 1050 with the determination of the median reference structural pattern mm(gr) of the set of patterns gr. This determination is carried out as previously described with reference to FIG. 9.

After step 1050, step 1060 optimizes the reference structural pattern mm(gr) before adding it to the set of reference structural patterns mr. This optimization consists of removing from the reference structural pattern mm(gr) all the items of that pattern contained in a pattern of the set of reference structural patterns mr, that deletion respecting the order of the items. Thus, the optimized pattern corresponds to the difference between the combination of the patterns of the set of reference structural patterns mr and the "average" of the patterns of the set of patterns gr.

As a variant, the optimization of the reference structural pattern mm(gr) also comprises the deletion of the identifier of the XML element that it represents.

According to another variant, the calculation of the median reference structural pattern for the set of patterns gr at step 1050 uses a different formula for the measurement of the representativeness c(m) than at the time of the calculation of the median reference structural patterns for the groups of M at step 1010. This makes it possible for example to use a formula for the measurement of the representativeness c(m) making it possible to obtain a median reference structural pattern close to the intersection of the patterns of the group considered at step 1010, whereas at step 1050, a formula will be used for the measurement of the representativeness c(m) making it possible to obtain a median reference structural pattern close to the encompassing pattern for the patterns considered.

After step 1060, the algorithm continues at step 1030 described earlier.

In the case in which the set of patterns gr is empty at step 1040, the algorithm continues at step 1070 consisting of generating the list of reference structural patterns mc(g) representing the group g on the basis of the set of reference structural patterns mr.

In that list of reference structural patterns mc(g), the median reference structural pattern has a particular role: it is the principal reference structural pattern of the set of the complementary reference structural patterns for the group g.

The algorithm terminates at step 1080.

Once the reference structural patterns have been determined, it is possible to describe the structure of the document containing the hierarchized data by associating the reference structural patterns with the different structures of the document, and advantageously with the elements of the document.

For this, for each XML element of the document the primary structural pattern is obtained which was associated with it at the time of the extraction of the primary structural patterns carried out for example according to the algorithm described with reference to FIG. 3, then the group to which that primary structural pattern belongs is searched for among all the groups of primary structural patterns M, and the reference structural pattern representative of that group is determined.

Where the complementary reference structural patterns are used, commencement is made by determining which principal reference structural pattern is the closest to the XML element. Next, from all the complementary reference structural patterns linked to that principal reference structural pattern, determination is made of those which make it possible to fully describe the primary structural pattern associated with the XML element. In practice, a group of complementary structural patterns is sought of which the combination with the principal reference structural pattern encompasses the basic pattern associated with the XML element.

The reference structural patterns so obtained will be used to represent the structure of that XML element.

The same principle may be applied when it is required to represent a more complex structure of elements by an associated reference structural pattern.

The association between the reference structural pattern and the corresponding data structure may be stored in memory either in a specific file, or directly in the document using a particular attribute.

In a variant embodiment, and for certain applications such as compression, it may be desirable to apply the concept of reference structural patterns only to a part of the document. This is the case for example when a group only contains a single primary structural pattern, that is to say that none other is associated with it since it is too distant from all the others.

The invention also concerns a method of coding hierarchized data based on the concept of reference structural patterns. The coding is used, in particular, for the compression of the data.

This method comprises in particular the steps of generating reference structural patterns adapted to represent hierarchized data, of determining the pieces of information on difference between the reference structural patterns and the hierarchized data and of coding the hierarchized data.

The objective of the coding is to reduce the size of the document containing the hierarchized data for their exchange between a coding unit and a decoding unit. The coding unit and the decoding unit are for example located in remote devices that are linked by a communication network. However, they may be situated in the same device when it is required to reduce the size of the data document for its storage on a disc.

The reference structural patterns which will serve for the coding are recorded, beforehand or during the coding, in the same document which contains the coded hierarchized data, which enables the decoding unit to use them during the decoding. However, it is possible for the reference structural patterns to be recorded in a separate document or exchanged by any other means between the two units.

An example of implementation of the coding method using reference structural patterns is given by FIG. 7.

The first step (step 710) consists of using one of the implementations of the method of generating reference structural patterns applied to the hierarchical data to code.

The second step (step 720) consists of determining pieces of information on structural difference between the reference structural patterns generated at the preceding step and the hierarchized data which are associated with them. This is because structural differences may exist given that the reference structural patterns are not necessarily the primary structural patterns associated with those data.

The following step (step 730) consists of determining pieces of content information relative to the pieces of structural information associated with the hierarchized data. These pieces of content information are also viewed as pieces of difference information since they represent the pieces of information which must be added to the pieces of structural information to recover all the hierarchized data.

The last step (step 740) represents the coding step which uses the pieces of structural and content difference information, as well as either the description of the structure of the reference structural pattern itself, or a reference thereto, to code the hierarchized data.

Consider for example the application of the method of FIG. 7a for coding the hierarchized data written in XML language in FIG. 5b, using reference structural patterns of order 2.

First, primary structural patterns of order 2 are extracted from the hierarchized data using for example the methods of FIGS. 3 and 4. The result of such extracting methods consists in three primary structural patterns m1, m2 and m4 as depicted in FIG. 5d.

Then, the extracted primary structural patterns are grouped into two groups, a first group g(m1)={m1} associated to primary structural pattern m1 and a second group g(m2)={m2, m4} associated with the primary structural pattern m2.

The group g(m1) contains only one element, and m1 is chosen as the reference structural pattern for this group.

The group g(m2) contains two elements, and the pattern m2 associated with this group is chosen as the reference structural pattern of this group, as it is the most frequently used pattern of the group (m2 is used twice, by the nodes 2 and 3 of FIG. 5b, m4 is used only once, by the node 4 of FIG. 5b). Other options of course exist for choosing the reference structural pattern as described above.

The reference structural pattern m2 is then used to code all the instances of the primary structural patterns m2 and m4 (nodes 2, 3 and 4).

As indicated above, the reference structural pattern which serves for the coding is recorded, beforehand or during the coding, for example in the same document which contains the coded hierarchized data.

In the following an example is given on how to actually encode node 3 and node 4 (instance of the structural pattern m4) using m2. For completeness, we show also how to encode an instance, referred to as node 12 (not depicted in the figures), identical to the instance of the structural pattern m2 (node 2) except that it has a different node identifier (element type). Let's assume that node 12 is described as follows:

<manager>
<forename>Paul</forename>
<surname>Anderson</surname>
</manager>

First of all, coding rules are set. Knowledge of these coding rules should be shared between the coder and the decoder. The coding rules in the present example are summarized in FIG. 7b.

On the left side of the table there is provided bit codes of one or more fields used to encode the hierarchized data. On the right side of the table, there is provided explanation about the meanings of those codes. The right side explanation is given for information only and is not part of the coding as such.

The codes chosen in FIG. 7b are rather simple codes in order to illustrate the principle of the encoding method. In a variant, the coding can be optimized by using variable size fields in order to limit as much as possible any redundant information.

The coding rules allow, on one hand, to define the reference structural patterns as for example m2, in addition usual element types, and on the other hand to use such definitions to create instances of those reference structural patterns or elements.

FIG. 7c implements the coding rules in order to define the reference structural pattern m2, and its child elements "forename" and "surname".

These definitions are used to encode node 3 of FIG. 5b, node 4 of FIG. 5b, and node 12 as illustrated in FIG. 7d.

The coding depicted in FIG. 7d is illustrative as it represents only part of the hierarchized data coding (for example the coding of node 2 of FIG. 5b is not shown).

Similarly to FIG. 7b, on the left side of the table in FIGS. 7c and 7d there is provided bit codes representing the different pieces of information of the hierarchized data and on the right side of the table, there is provided some explanations about the meanings of those codes in accordance with FIG. 7b.

It should be noted that the coding of the instance requires less coding space as it is based on the coding the reference structural pattern. High compression rate is then expected when the number of instances is important.

For example, in order to code the element "manager" common child-items with the element "employee" ("forename" and "surname") that were already coded (FIG. 7c) have been reused. A specific code ("0011 0000") has been used to indicate the difference with reference structural pattern m2 which is the substitution of "employee" by "manager". The encoding of node 12 consists then into the encoding of the difference with reference pattern m2 ("employee"/"manager") in addition to the encoding of the content information which is "Paul" and "Anderson".

In order to implement the methods of generating reference structural patterns adapted to represent hierarchized data and of coding those data using those reference structural patterns, a device for generating reference structural patterns comprises in particular means for extracting primary structural patterns, means for grouping the primary structural patterns and means for determining reference structural patterns for each group identified, and a coding device comprising in particular the means of the device for generating reference structural patterns, means for determining pieces of information on difference between the reference structural patterns and the associated hierarchized data, and means for coding the hierarchized data according to the reference structural patterns and the pieces of difference information.

These devices for generating reference structural patterns and for coding may be incorporated in a computer 800 such as illustrated in FIG. 8.

In particular, the different means identified above may be incorporated in a read-only memory (or ROM) 805 adapted to store a program for generating patterns and/or coding in accordance with the invention.

The random-access memory (or RAM) 810 is adapted to store in registers the values modified on execution of the generating and coding program.

The microprocessor 820 is integrated into a computer 800 which may be connected to different peripherals and to other computers of a communication network.

That computer comprises in known manner a communication interface 830 connected to the communication network 835 to receive or transmit messages. The computer further comprises means for storage of documents, such as a hard disk 870 or is adapted to cooperate by means of a disk drive 880 (for diskettes, compact discs or computer cards) with removable document storage means such as disks 885. These fixed or removable storage means may comprise the code of the method of generating structural patterns or of coding according to the invention.

They are also adapted to store an electronic document containing hierarchized data as defined by the present invention.

As a variant, the program enabling the device for generating structural patterns or coding to implement the invention can be stored in the read only memory 805.

As a second variant, the program can be received and stored as described previously via the communication network 835. The computer 800 also has a screen 840 which may for example serve as an interface with an operator with the use of the keyboard 850 or the mouse 860 or of any other means.

The central processing unit 820 (CPU) will then execute the instructions relating to the implementation of the invention. On powering up, the programs and methods relating to the invention, stored in a non-volatile memory, for example the memory 805, are transferred into the memory 810, which will then contain the executable code of the invention as well as the variables necessary for implementing the invention.

The communication bus 890 affords communication between the different sub-elements of the computer 10 or connected to it.

The representation of the bus 890 is not limiting and in particular the microprocessor 820 may communicate instructions to any sub-element directly or by means of another sub-element.

Naturally, numerous modifications can be made to the example embodiments described above without departing from the scope of the invention.

The invention claimed is:

1. A method of generating reference structural patterns adapted to represent hierarchized data comprising:
   extracting primary structural patterns associated with the hierarchized data, each of the primary structural patterns representing a set of pieces of structural information;
   determining a degree of use of the extracted primary structural patterns on a basis of a number of hierarchized pieces of data able to be represented by the extracted primary structural patterns;
   grouping the extracted primary structural patterns into groups of primary structural patterns, wherein the grouping comprises grouping primary structural patterns that are close with respect to a distance between the primary structural patterns that is weighted by the degree of use of at least one of the primary structural patterns;
   determining one reference structural pattern per group of determined primary structural patterns, the reference structural pattern being adapted to represent the primary structural patterns of a group associated with it;
   determining pieces of information on difference between the reference structural patterns and the associated hierarchized data; and
   coding the hierarchized data according to the reference structural patterns and the pieces of difference information,
   wherein the reference structural pattern associated with the group is determined on the basis of at least some of the primary structural patterns of the group and, for each primary structural pattern a measurement of representativeness with resect to the hierarchical data associated with primary structural patterns of the group, the reference structural pattern so determined being referred to as a median reference structural pattern, and
   wherein the reference structural pattern associated with the group is more particularly determined on the basis of the primary structural patterns having the highest representativeness measurements.

2. The method according to claim 1, wherein the hierarchized data is organized into a plurality of items, with an item representing a node if it contains at least one other item being referred to as a child item, and wherein the pieces of structural information of a primary structural pattern are relative to a node and to its direct child items.

3. The method according to claim 1, wherein the hierarchized data is organized into a plurality of items, with an item representing a node if it contains at least one other item being referred to as a child item, and wherein the pieces of structural information of a primary structural pattern are relative to a plurality of nodes having a hierarchical relationship between them.

4. The method according to claim 1, wherein the hierarchized data are described in a markup language structuring the hierarchized data.

5. The method according to claim 1, wherein the step of grouping primary structural patterns comprises the following steps:
   selecting the primary structural pattern having a degree of use among the highest degrees of use;
   grouping primary structural patterns situated, with respect to the selected primary structural pattern, at a distance less than or equal to a predetermined value; and
   repeating the steps of selecting and grouping with respect to the primary structural patterns not yet grouped.

6. The method according to claim 1, wherein the distance between a first and second primary structural pattern depends on the degree of use of the first primary structural pattern.

7. The method according to claim 1, wherein the groups resulting from the grouping step comprise primary structural patterns which, considering them two at a time, are situated at a distance less than or equal to the predetermined value.

8. The method according to claim 1, wherein the distance between a first and a second primary structural pattern depends on the number of pieces of structural information to add and/or to delete and/or to modify with respect to the first primary structural pattern to obtain the second primary structural pattern.

9. The method according to claim 1, wherein the degree of use of a primary structural pattern is determined on the basis of the number of pieces of hierarchized data of which the pieces of structural information correspond to the pieces of structural information of that primary structural pattern.

10. The method according to claim 1, wherein the reference structural pattern associated with the group corresponds to the primary structural pattern of the primary structural patterns of a group having the highest degree of use.

11. The method according to claim 1, wherein the reference structural pattern associated with the group is constructed by combining the pieces of structural information from all the primary structural patterns of the group, the reference structural pattern so determined being referred to as the encompassing reference structural pattern.

12. The method according to claim 1, wherein the measurement of representativeness of a primary structural pattern depends on the degrees of use of the primary structural patterns of the group.

13. The method according to claim 1, wherein the measurement of representativeness of a primary structural pattern is the sum of the degrees of use of the primary structural patterns of the group, weighted by the distances between the primary structural pattern considered and the primary structural patterns of the group.

14. The method according to claim 1, wherein the method comprises a step of determining a complementary reference structural pattern associated with the group, the complementary reference structural pattern comprising pieces of structural information of primary structural patterns of the group not included in the median reference structural pattern of the group.

15. The coding method according to claim 1, wherein the pieces of information on difference between the reference structural patterns and the associated hierarchized data comprise pieces of structural information and pieces of content information.

16. A computer program product stored in a non-transitory computer-readable medium the computer program product comprising sequences of instructions for implementing a method of generating reference structural patterns according to claim 1, when the computer program product is loaded and executed by a programmable apparatus.

17. A device including at least one processor for generating reference structural patterns adapted to represent hierarchized data, comprising:

an extracting unit constructed to extract primary structural patterns associated with the hierarchized data, each of the primary structural patterns representing a set of pieces of structural information;

a determining unit constructed to determine a degree of use of the extracted primary structural patterns on a basis of a number of hierarchized pieces of data able to be represented by the extracted primary structural patterns;

a grouping unit constructed to group the extracted primary structural patterns into groups of primary structural patterns, wherein the grouping comprises grouping primary structural patterns that are close with respect to a distance between the primary structural patterns that is weighted by the degree of use of at least one of the primary structural patterns;

a determining unit constructed to determine one reference structural pattern per determined group of primary structural patterns, the reference structural pattern being adapted to represent the primary structural patterns of a group associated with it;

a determining unit constructed to determine pieces of information on difference between the reference structural patterns and the associated hierarchized data; and a coding unit constructed to code the hierarchized data according to the reference structural patterns and the pieces of difference information, wherein the reference structural pattern associated with the group is determined on the basis of at least some of the primary structural patterns of the group and, for each primary structural pattern a measurement of representativeness with resect to the hierarchical data associated with primary structural patterns of the group, the reference structural pattern so determined being referred to as a median reference structural pattern, and wherein the reference structural pattern associated with the group is more particularly determined on the basis of the primary structural patterns having the highest representativeness measurements.

* * * * *